United States Patent [19]

Kiriki

[11] Patent Number: 5,414,560
[45] Date of Patent: May 9, 1995

[54] SINGLE LENS

[75] Inventor: Toshihiko Kiriki, Hachioji, Japan

[73] Assignee: Konica Corporation, Tokyo, Japan

[21] Appl. No.: 161,152

[22] Filed: Dec. 2, 1993

[30] Foreign Application Priority Data

Dec. 7, 1992 [JP] Japan .................. 4-351158

[51] Int. Cl.$^6$ .................................. G02B 3/02
[52] U.S. Cl. .................... 359/654; 359/718; 359/739
[58] Field of Search ............... 359/652–654, 359/708, 718, 739–740, 796; 354/202, 195.11, 195.12, 195.1

[56] References Cited

U.S. PATENT DOCUMENTS 3,902,792  9/1975  Plummer .................. 359/718
4,812,866  3/1989  Ushiro et al. .............. 354/202
5,184,251  2/1993  Tsuchida et al. ........... 359/654

Primary Examiner—Loha Ben
Assistant Examiner—James Phan
Attorney, Agent, or Firm—Frishauf, Holtz, Goodman & Woodward

[57] ABSTRACT

An optical device comprises a single lens of a meniscus-type lens whose index of refraction is distributed in a radial direction perpendicular to the optical axis thereof, and a diaphragm having an aperture and provided at the concave side of the meniscus-type lens, wherein the optical device satisfies following formulas, $7 \leq F \leq 16$ $20° \leq 2\omega \leq 90°$.

9 Claims, 9 Drawing Sheets

F 9.8

ω = 37°

ω = 37°

ω = 37°

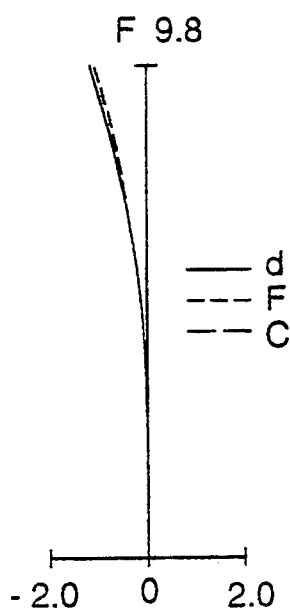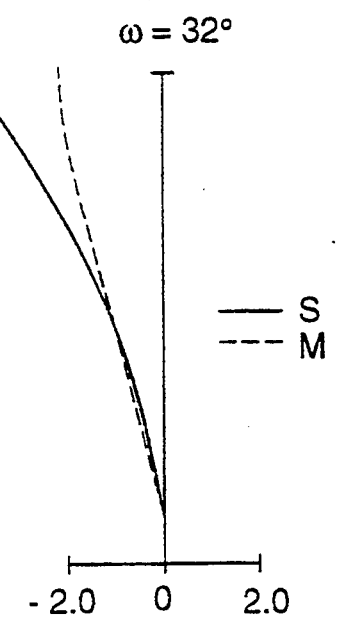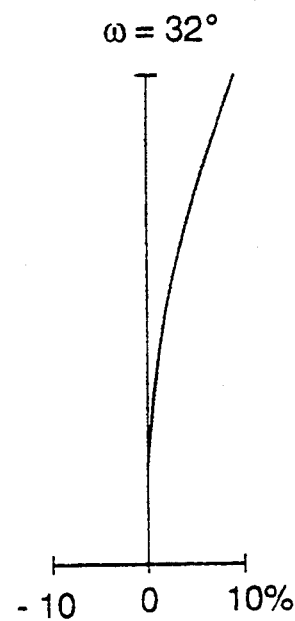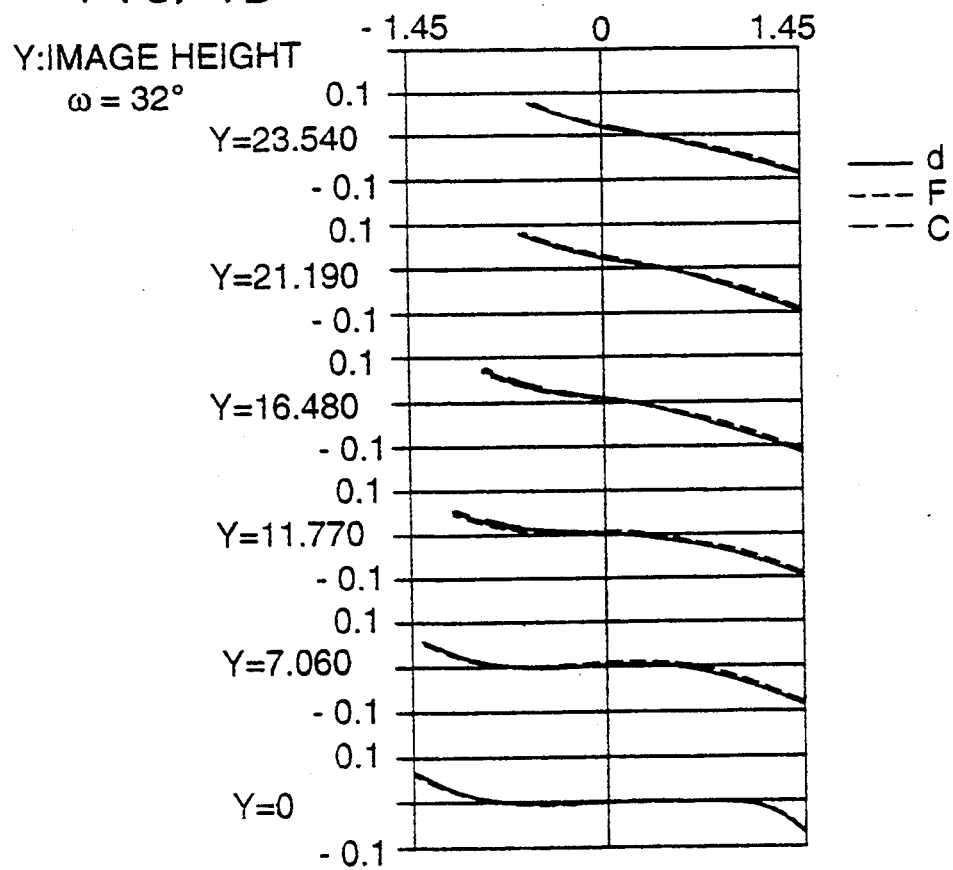

F 9.8

ω = 30°

ω = 30°

F 13.5

ω = 17°

ω = 17°

F 9.8
— d
--- F
-- C

ω = 35.5°
— S
--- M

ω = 35.5°

Y: IMAGE HEIGHT
ω = 35.5°
— d
--- F
-- C

F 9.8

ω = 37°

ω = 37°

5,414,560

SINGLE LENS

BACKGROUND OF THE INVENTION

The present invention relates to a single lens having a refractive index distribution in its radial directions, and especially to the single lens, the chromatic aberration of which is corrected.

Conventionally, the single lens having a homogeneous refractive index is used for a single use camera in which a film is accommodated, and the case of which is disassembled so that the exposed film is taken out after exposure. For the lens having this homogeneous refractive index, a plastic molded lens is used which is made by a process of injection molding to reduce the cost of the lens. Further, acrylic resin material, in which the refractive index of a d, line is approximately 1.49 and an Abbe number is approximately 57, is used for this lens in many cases.

Conventionally, a photographic lens which is a single lens and which has a refractive index distribution has been studied, and the following research papers are disclosed: for example, a study by L. G. Atkinson and et al. ("Applied Optics" Vol. 21 No. 6 p. 993–998), and a study by E. W. Marchand ("Applied Optics" Vol. 19 No. 7 p. 1044–1051).

Further, concerning a lens for an optical disc, which is a single lens and has a refractive index distribution, various patent applications, such as Japanese Patent Publication Open to Public Inspection Nos. 163312/1986, 116613/1989, and the like, have been disclosed and are widely known.

In the foregoing conventional engineering, initially, when the lens having the homogeneous refractive index was used, axial chromatic aberration and transverse chromatic aberration remained in the single lens. These residual chromatic aberrations can not be removed even when an aspherical surface is used for the lens, which is different from other aberrations in monochrome. Further, because parameters of the photographic lens for a camera which is of the single lens type having a homogeneous refractive index are limited in lens design work, it is difficult to balance the spherical aberration and the curvature of the field.

On the other hand, in the photographic lens for a camera, the lens of which is the single lens having a refractive index and was studied by L. G. Atkinson and et al, and E. W. Marchand, lens specifications in which the lens has a relatively smaller F number, that is, an F number of approximately 2 to 6.3, are studied, and a problem remains in which, mainly, astigmatism can not be corrected in the lens.

Further, inventions which have been disclosed in Japanese Patent Publication Open to Public Inspection Nos. 101415/1990, and 176905/1986 are limited to a lens, which has a refractive index distribution in the direction of an optical axis, which is called an axial distribution, and as clearly understandable from the specifications, a radial distribution is basically more effective for aberration correction than the axial distribution.

Further, in many patents with respect to a lens for an optical disc, which is a single lens and has a refractive index distribution, it is not intrinsic characteristic of the lens to correct the chromatic aberration, and an angle of view in the lens specification is approximately satisfied by $\omega = 1°$, which are basically different from the present invention.

SUMMARY OF THE INVENTION

An object of the present invention is to provide a single focus photographic lens for a camera, especially a single lens, which is appropriate for a single use camera in which a film is accommodated, in which a part of the body is disassembled, and from which the exposed film is taken after exposure has been completed, wherein the lens is processed in the manner that: a refractive index distribution is provided in the radial directions perpendicular to an optical axis; axial chromatic aberration and transverse chromatic aberration can be almost totally removed; and spheric aberration and curvature of the field are corrected so as to be well-balanced. Another object of the present invention is to provide a camera in which the foregoing lens is mounted.

The photographic lens according to the present invention is a meniscus-shaped single lens which has the refractive index distribution in radial directions perpendicular to the optical axis, and on the concave side of which an aperture-stop is provided. This lens is satisfied by the following relations.

$$7 \leq F \leq 16 \quad (1)$$

$$20° \leq 2\omega \leq 90° \quad (2)$$

Where, an F number of the optical system is defined as F, and an angle of view of the lens is defined as $2\omega$.

In this lens, the surface on the object side is convex, and the surface on the image side is concave. It is preferable that the lens is used in such a manner that the aperture-stop is on the image side of the lens.

Although it is preferable that the image formation surface is curved similarly to the lens surface, and specifically the image formation surface is a cylindrical surface which is curved in the same direction as the lens, it may also be a flat plane.

Further, in the single lens, when the refractive index distribution on the radial directions perpendicular to its optical axis is defined as follows, $n_i = n_0 i + n_1 i h^2 + n_2 i h^4 + n_3 i h^6$ i: "i" shows d, F, or C line h: the vertical distance from the optical axis, then, the lens according to the present invention is characterized in that:

$$n_1 c - n_1 d < 0 \quad (3)$$

$$n_1 F - n_1 d > 0 \quad (4)$$

Further, a lens which satisfies the following relations is preferable.

$$n_2 c - n_2 d < 0 \quad (5)$$

$$n_2 F - n_2 d > 0 \quad (6)$$

Although both of the surfaces of the object side and image side of the lens may be formed of spherical surfaces, it is of course advantageous for well-balanced correction of aberrations that at least one of the lens surfaces is formed as an aspherical surface.

When it is assumed that the film is a 35 mm roll film and the focal length of the lens is f mm, it is preferable that the following relation is satisfied:

$$20 \leq f \leq 100 \tag{7}$$

The camera can be used as a so-called single use camera in which the film is accommodated and from which the exposed film is taken when the camera is disassembled after the exposure has been completed.

In the present invention, astigmatism which has been conventionally a problem in the photographic lens for these cameras, the lens of which is a single lens and has a refractive index distribution, can be solved by allowing the curvature of the field in lens design work when the F number is more than 7, and the image formation surface is curved similarly to the lens side, in the case where the refractive index is approximately 1.5 or the angle of view is large.

Further, in the case where the refractive index of lens material is approximately 1.8, the image formation surface may also be flat.

In any case, as described later in detail, when the refractive index distribution in the radial directions perpendicular to the optical axis is appropriately selected, the axial chromatic aberration and the transverse chromatic aberration can be almost totally removed and the image formation characteristics can be greatly improved.

Initially, when the F number is smaller than the lower limit of the equation (1), it is difficult that both the curvature of the field and the astigmatism of the spherical aberration and the axial aberration are satisfied. When the F number is larger than the upper limit in the equation (1), the F number is so large that the lens is not practical.

When the lens is mounted in the camera in which a 35 mm roll film is accommodated, equation (7) is a condition by which equation (2) is satisfied. When the specification of the lens is larger than the upper limit of equation (2), or lower than the lower limit of equation (7), that is, when a wide angle lens is used, it is difficult to correct the distortion aberration. Further, when the focal length is larger than the upper limit of equation (7), the spherical aberration becomes large, and practically, the F number must be larger.

When the image formation surface is curved similarly to the lens surface side, it may be formed by a cylindrical surface which is curved only in the direction of a long side of the image area, or it may be formed in the manner that the surface is curved by the equal amount or the surface is curved by the different amount in the directions of long and short sides of the image area.

In the single lens, when the refractive index distribution in radial directions perpendicular to the optical axis is expressed by the following equation:

$n_i = n_0 i + n_1 i h^2 + n_2 i h^4 + n_3 i h^6$ i: "i" shows d, F, or C line h: the vertical distance from the optical axis, then, initially, a secondary degree coefficient $n_1 i$ of the refractive index distribution in the radial directions is an element which contributes to the paraxial amount, and the axial chromatic aberration can be controlled by this coefficient.

Generally, in the lens material which is the base material for the single lens, the refractive index due to d, F, c line can be expressed by the following equation:

$n_0 F > n_0 d > n_0 c$

When equations (3) and (4) are satisfied by this equation, the axial chromatic aberration can be eliminated from the paraxial rays.

In a homogeneous single lens with a rear-mounted diaphragm, ray of F line has a positive transverse chromatic aberration with respect to that of d line, and ray of c line has a negative transverse chromatic aberration with respect to that of d line, at a position not on the axis. Accordingly, when the fourth degree coefficient $n_2 i$ of the refractive index distribution in the radial directions is determined to satisfy equations (5) and (6), the transverse chromatic aberration can be reduced to approximately zero.

Next, aberration correction by a reference wavelength, that is, aberration correction by the d line will be described as follows. In the composition of the lens, in the case where the radius of curvature of the lens surface is changed, the image surface at a position not on the axis moves to a negative side when the spherical aberration moves to a positive side in the drawings. Further, in the case where a second degree coefficient of the refractive index, that is, $n_1 d$ is changed, the image surface at a position not on the axis moves to a positive side when the spherical aberration moves to a positive side.

Further, when the fourth degree coefficient of the refractive index distribution, that is, $n_2 d$ is changed, the spheric aberration and the image surface at a position not on the axis move in the same direction as those in the case of the second degree coefficient $n_1 d$, and the image surface can be changed with respect to the angle of view and the coma can be changed at a high degree.

When the foregoing three parameters are well balanced, both of the sagittal image surface and the meridional image surface can be formed along the image formation surface even if the image formation surface is curved or plane, and the image formation characteristics at a position not on the axis can be increased.

The foregoing aberrations may be corrected so as to be well balanced by a coefficient of the refractive index distribution in the radial directions when the lens surface is assumed to be spherical, or it may be corrected so as to be well balanced when at least one of the lens surfaces is assumed to be aspherical and further caused to have the refractive index distribution in the radial directions.

BRIEF DESCRIPTION OF THE DRAWINGS

FIGS. 4A–4D is a view showing an aberration curve of the second example.

DETAILED DESCRIPTION OF THE PREFERRED EMBODIMENT p An example of the present invention will be shown as follows. Symbols shown in the following table are denoted as follows.

r: the radius of curvature of the refraction surface
d: distance between surfaces
nd: the refractive index of a d-line in lens material
νd : the Abbe number of lens material
f: focal length F: F number
ω: semi angle of view the refractive index distribution function:

$$ni = n_0 i + n_1 i h^2 + n_2 i h^4 + n_3 i h^6$$

h: the vertical distance from the optical axis
i: "i" shows d, F, or C line

Figure 11:
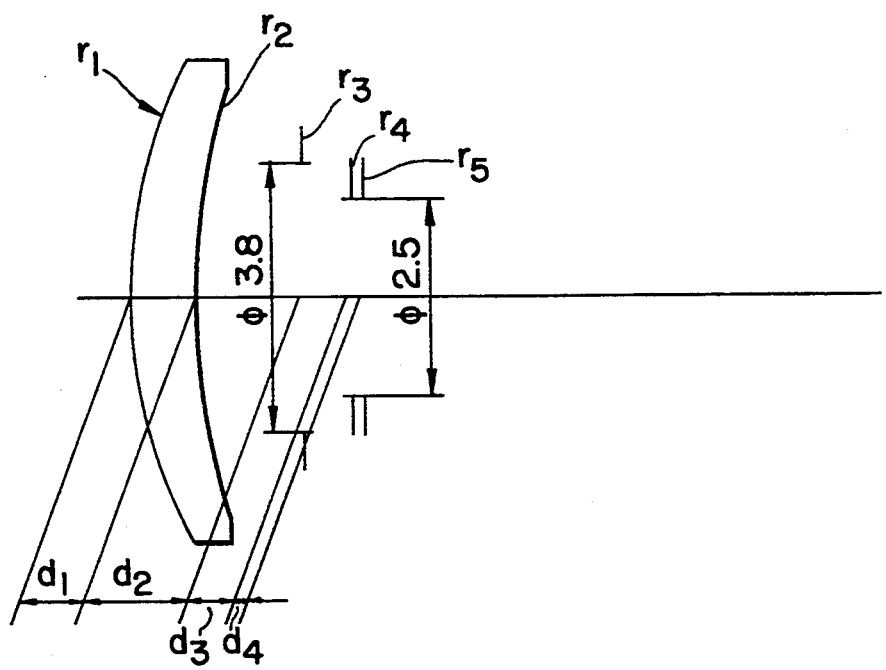
FIG. 11 is a sectional view showing the composition of the conventional single lens, which is shown for comparison.
Figure 10A:
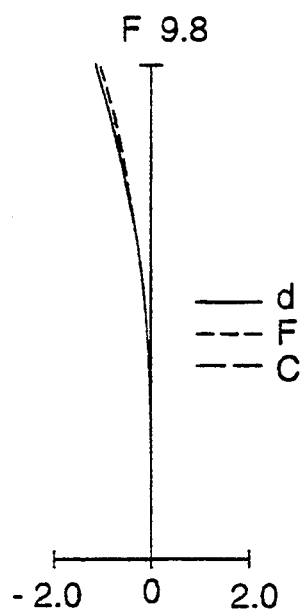
FIGS. 10A–10D is a view showing an aberration curve of the fifth example.
Figure 10B:
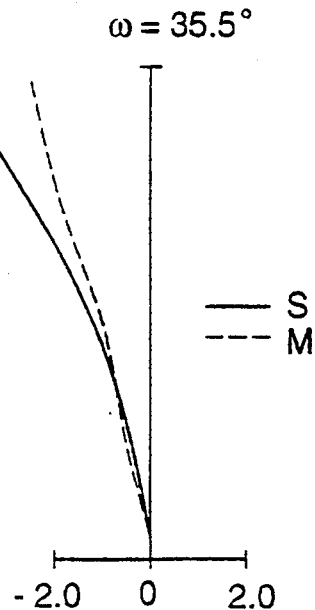
Figure 10C:
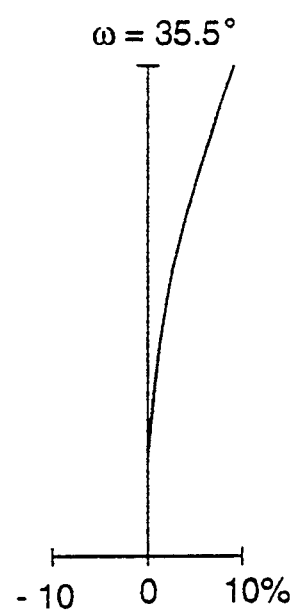
Figure 10D:
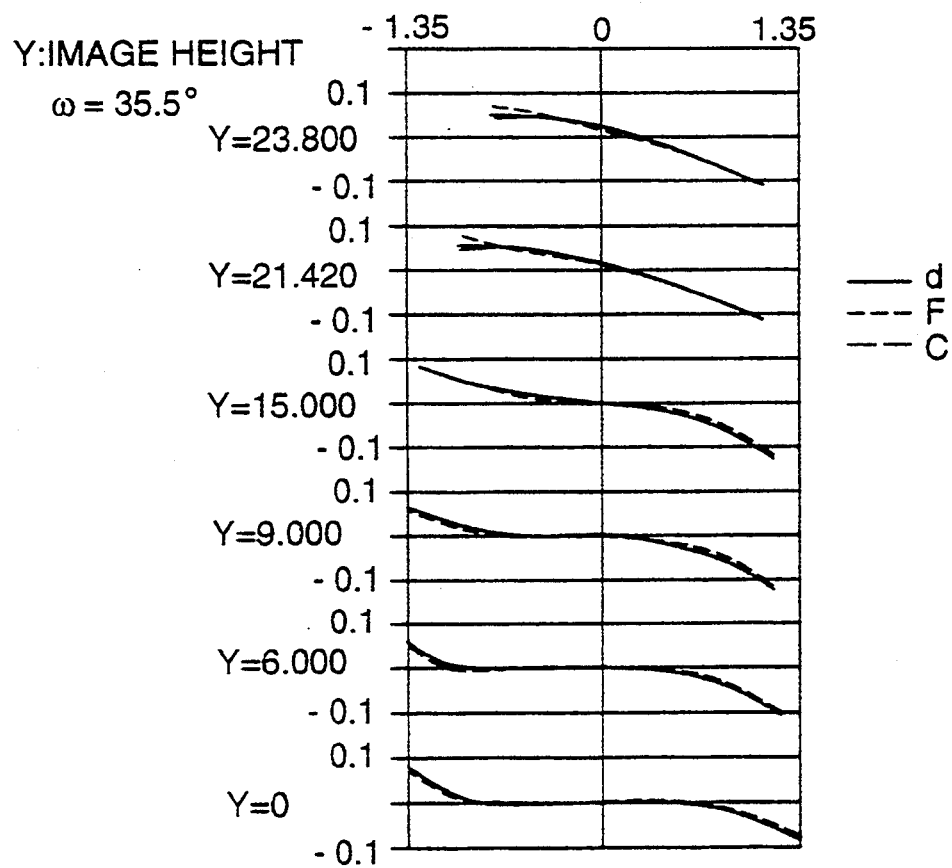
Figure 12A:
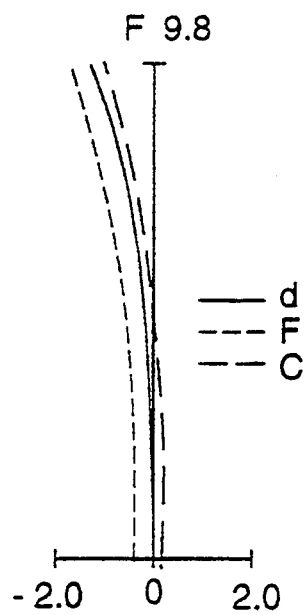
FIGS. 12A–12D is a view showing an aberration curve of the conventional single lens.
Figure 12B:
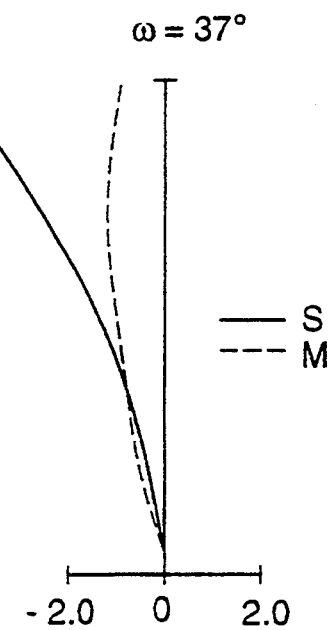
Figure 12C:
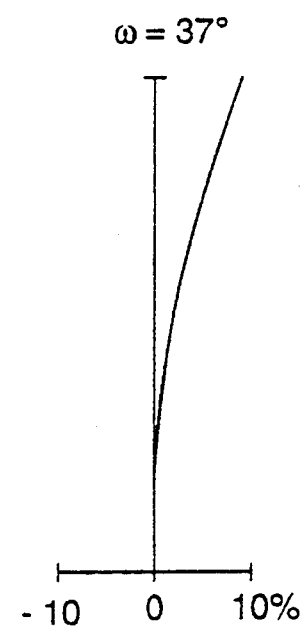
Figure 12D:
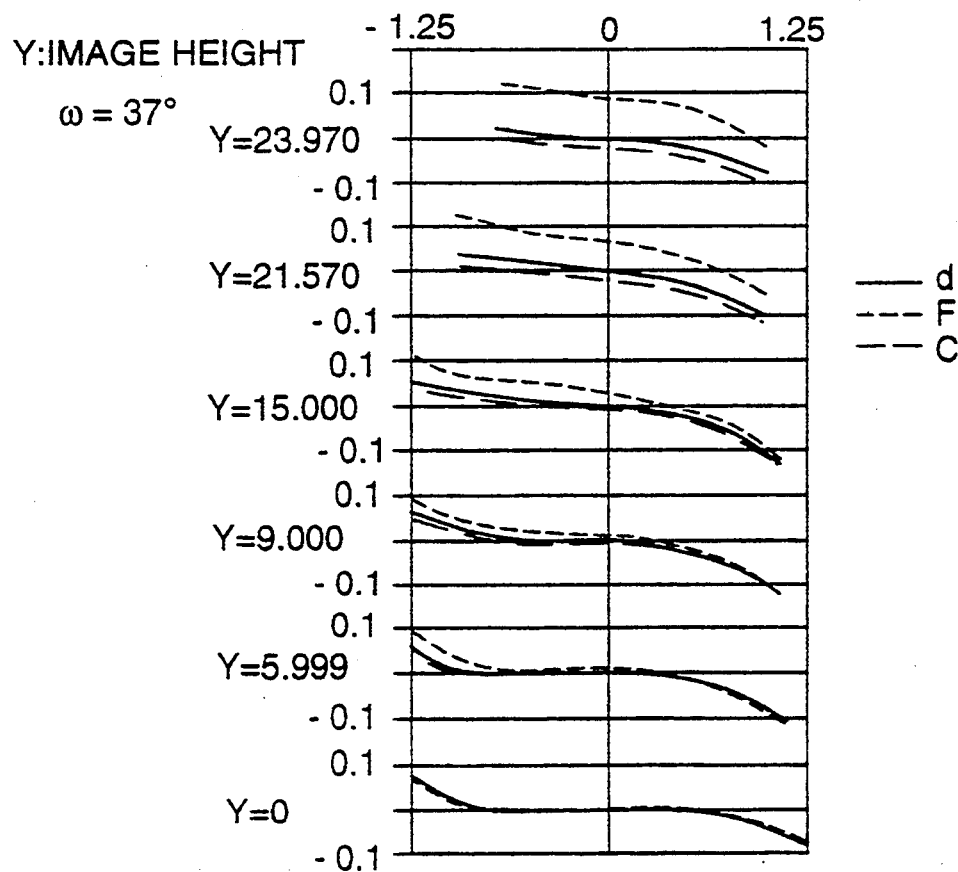

For comparison, a sectional view of the conventional lens is shown in Fig. 11, a view showing the aberration of the conventional lens is FIGS. 12A–12D, and its lens data is shown in the following table.

TABLE 1

| surface No. | f = 28.8<br>r | F 9.8<br>d | ω = 37°<br>nd | νd |
|---|---|---|---|---|
| 1. | 5.095 | 0.9 | 1.492 | 57 |
| 2. | 7.492 | 1.8 | | |
| 3. | diaphragm for<br>off-axis ray (Φ 3.8) | 0.8 | | |
| 4. | aperture-stop (Φ 2.5) | 0.2 | | |
| 5. | diaphragm for<br>off-axis ray (Φ 2.5) | | | |

At first, a lens according to the present invention will be shown in Table 2 as the first example under the condition that specifications of a focal length, an F number and an angle of view are the same as those of the foregoing conventional lens.

Figure 1:
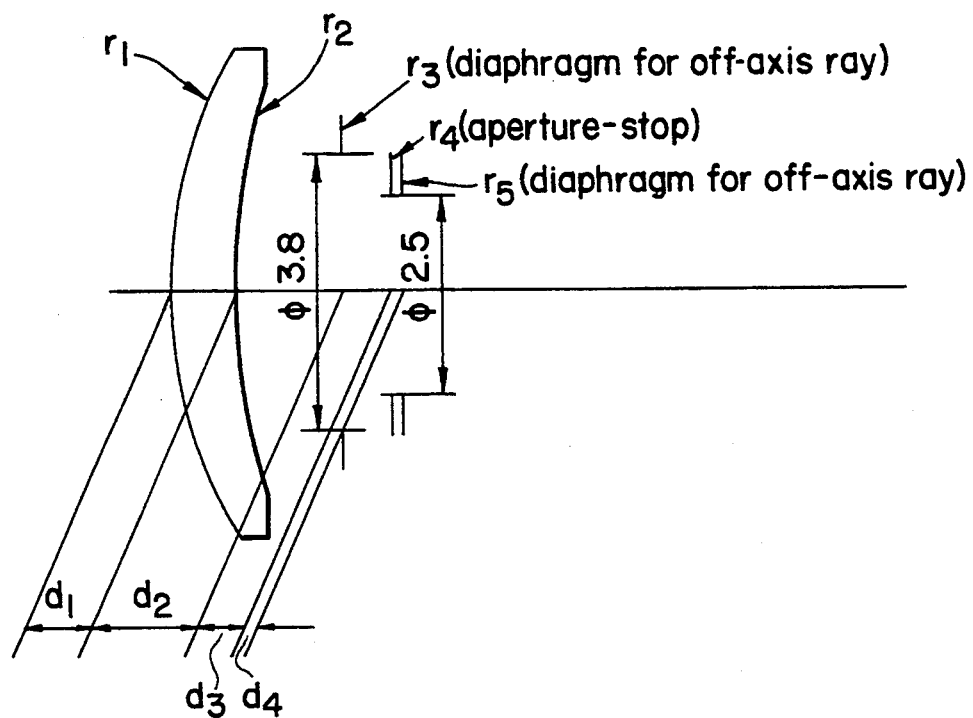
FIG. 1 is a sectional view showing the composition of the first example of a refractive index distribution type lens according to the present invention.

A sectional view of the lens of the first example is shown in FIG. 1, and a view of its aberration is shown in FIGS. 2A–2D.

TABLE 2

| surface No. | f = 28.8<br>r | F 9.8<br>d | ω = 37°<br>nd | νd |
|---|---|---|---|---|
| 1. | 5.095 | 0.9 | the refractive<br>index<br>distribution lens | |
| 2. | 7.714 | 1.8 | | |
| 3. | diaphragm for<br>off-axis ray (Φ 3.8) | 0.8 | | |
| 4. | aperture-stop (Φ 2.5) | 0.2 | | |
| 5. | diaphragm for<br>off-axis ray (Φ 2.5) | | | |

| A refractive index distribution function | | | |
|---|---|---|---|
| wavelength | $n_0 i$ | $n_1 i$ | $n_2 i$ |
| d | 1.4920 | $0.100 \times 10^{-2}$ | $0.12 \times 10^{-3}$ |
| F | 1.4980 | $0.125 \times 10^{-2}$ | $0.17 \times 10^{-3}$ |
| c | 1.4894 | $0.89 \times 10^{-3}$ | $0.10 \times 10^{-3}$ |
| Image formation surface R110 | | | |

Figure 3:
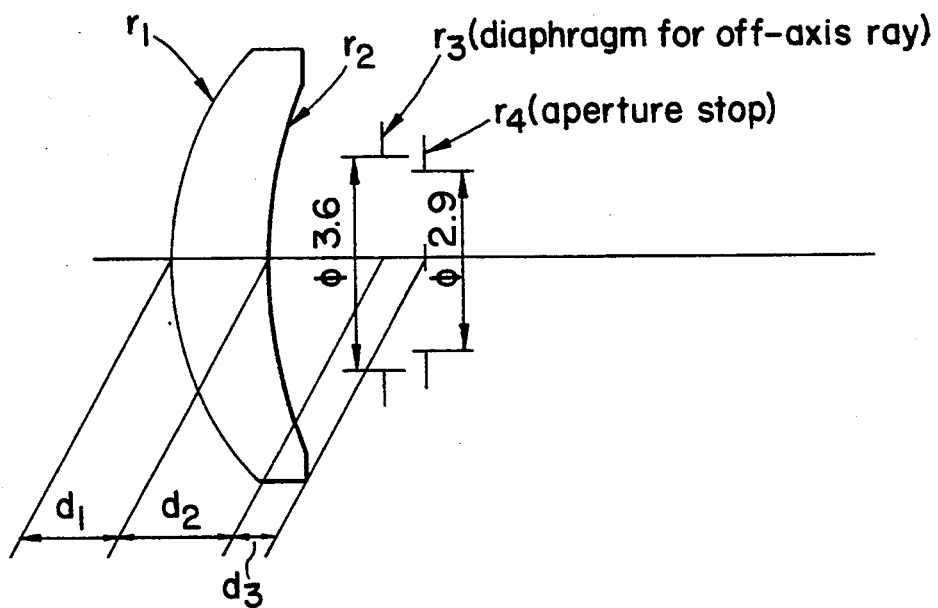
FIG. 3 is a sectional view showing the composition of the second example of the refractive index distribution type lens according to the present invention.
Figure 2A:
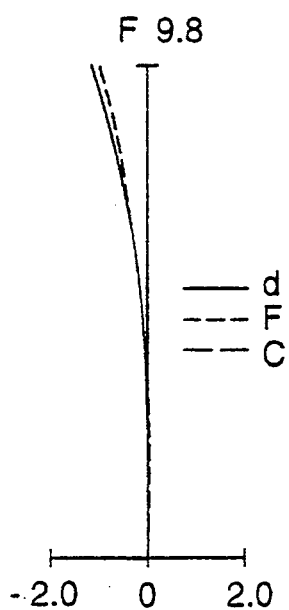
FIGS. 2A–2D is a view showing an aberration curve of the first example.
Figure 2B:
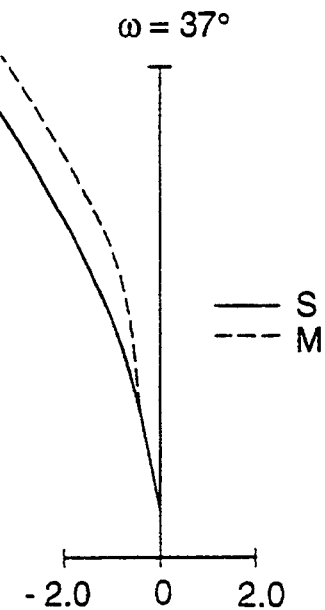
Figure 2C:
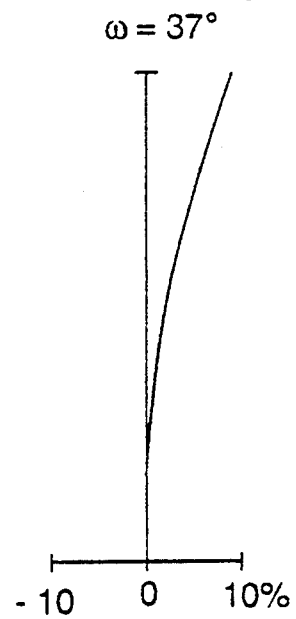
Figure 2D:
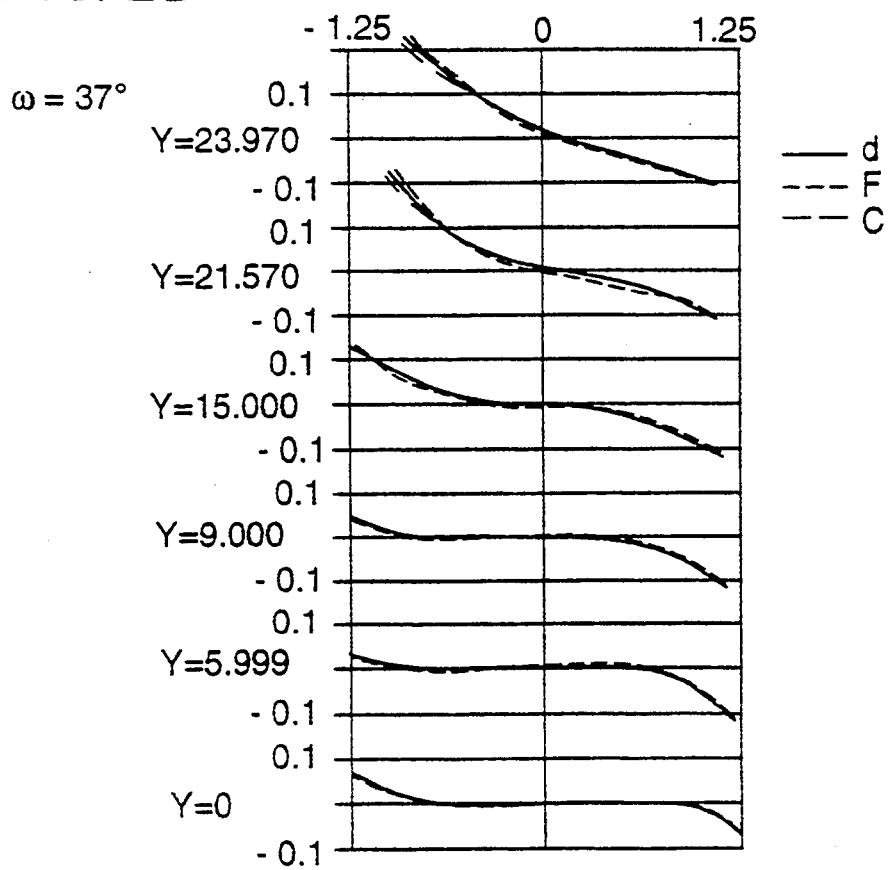

An example in which the focal distance is a certain amount longer than that in the case of the first example is shown below as the second example. A sectional view of the lens in the second example is shown in FIG. 3, and a view showing the aberration ms shown in FIGS. 4A–4D.

TABLE 3

| surface No. | f = 35.2<br>r | F 9.8<br>d | ω = 32°<br>nd | νd |
|---|---|---|---|---|
| 1. | 7.241 | 1.9 | the refractive<br>index<br>distribution lens | |
| 2. | 11.358 | 2.6 | | |
| 3. | diaphragm for<br>off-axis ray (Φ 3.6) | 1.4 | | |
| 4. | aperture-stop (Φ 2.9) | | | |

| A refractive index distribution function | | | |
|---|---|---|---|
| wavelength | $n_0 i$ | $n_1 i$ | $n_2 i$ |
| d | 1.4920 | 0.0 | 0.0 |
| F | 1.4980 | $0.10 \times 10^{-3}$ | $0.6 \times 10^{-5}$ |
| c | 1.4894 | $-0.50 \times 10^{-4}$ | $-0.3 \times 10^{-5}$ |
| Image formation surface R110 | | | |

Figure 5:
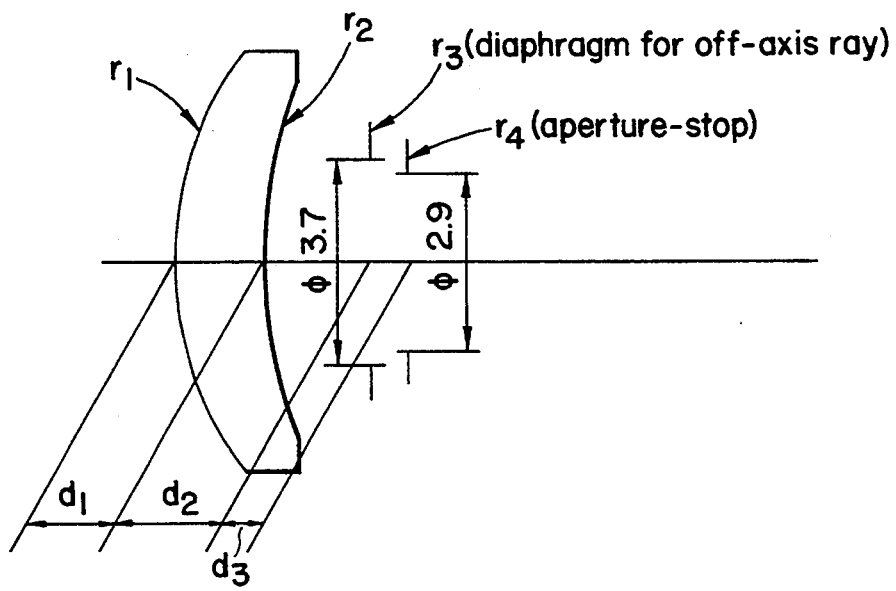
FIG. 5 is a sectional view showing the composition of the third example of the refractive index distribution type lens according to the present invention.

An example in which the refractive index of lens material is larger than that in the cases of the first and second examples is shown below as the third example. A sectional view of the lens in the third example is shown in FIG. 5, and the view showing the aberration ms shown in FIGS. 6A–6D.

TABLE 4

| surface No. | f = 35.2<br>r | F 9.8<br>d | ω = 30°<br>nd | νd |
|---|---|---|---|---|
| 1. | 7.300 | 1.9 | the refractive<br>index<br>distribution lens | |
| 2. | 8.843 | 2.6 | | |
| 3. | diaphragm for<br>off-axis ray (Φ 3.7) | 1.4 | | |
| 4. | aperture-stop (Φ 2.9) | | | |

| A refractive index distribution function | | | |
|---|---|---|---|
| wavelength | $n_0 i$ | $n_1 i$ | $n_2 i$ |
| d | 1.77250 | 0.0 | 0.0 |
| F | 1.78337 | $0.12 \times 10^{-3}$ | $0.7 \times 10^{-5}$ |
| c | 1.76780 | $-0.57 \times 10^{-4}$ | $-0.3 \times 10^{-5}$ |
| Image formation surface plane | | | |

Figure 7:
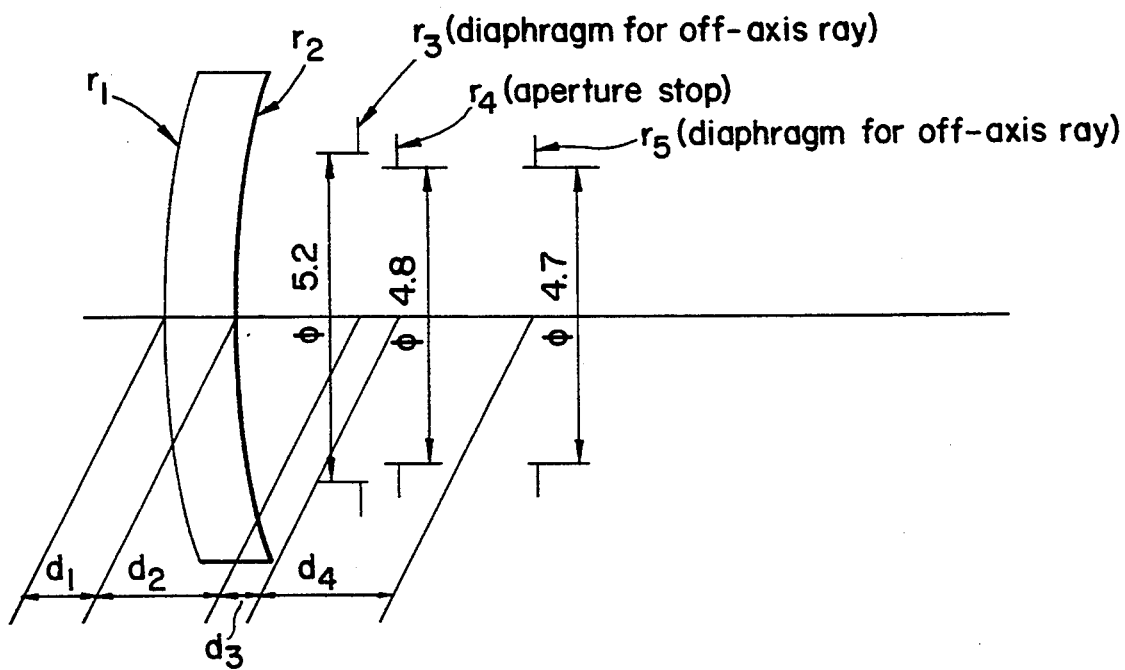
FIG. 7 is a sectional view showing the composition of the fourth example of the refractive index distribution type lens according to the present invention.
Figure 6A:
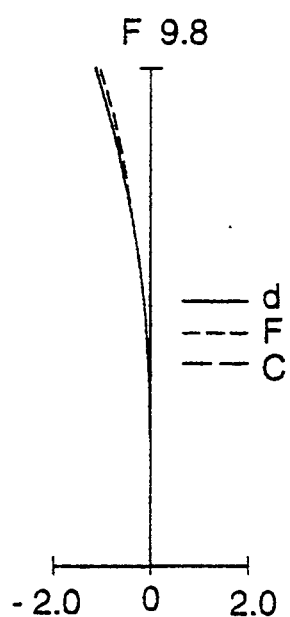
FIGS. 6A–6D is a view showing aberration curve of the third example.
Figure 6B:
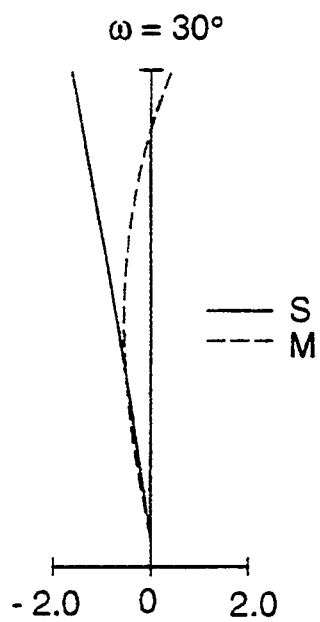
Figure 6C:
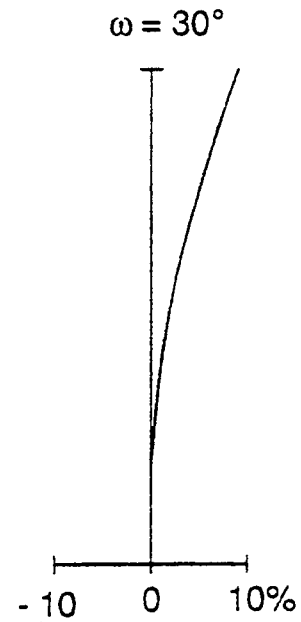
Figure 6D:
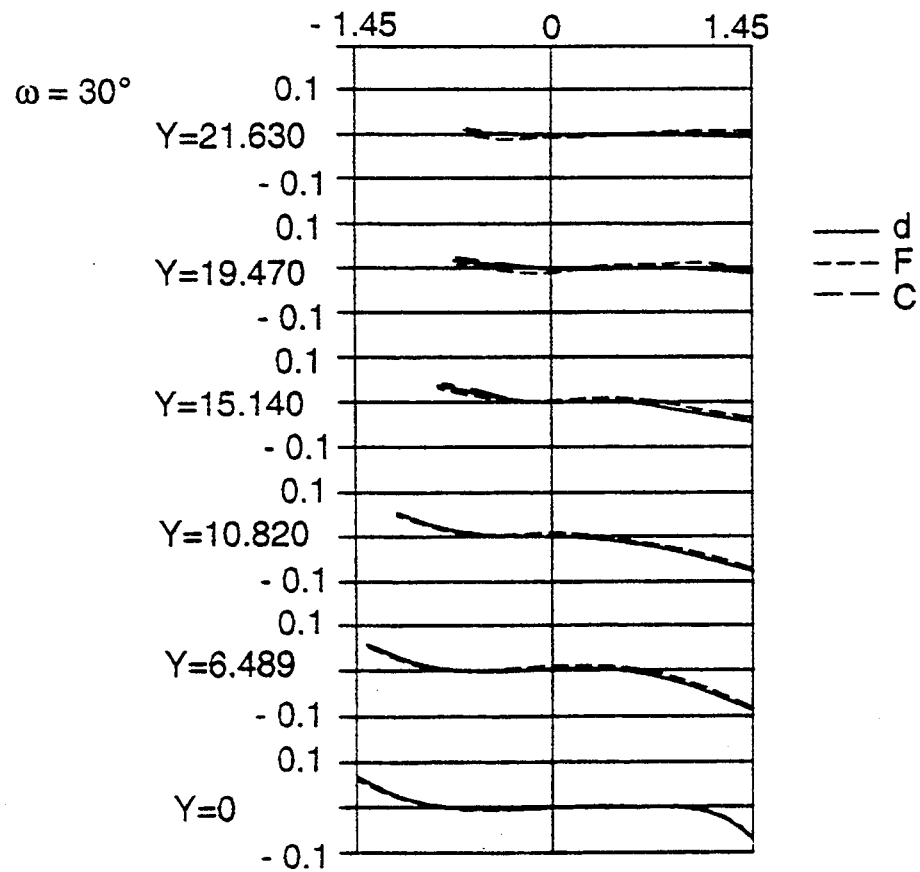
Figure 8A:
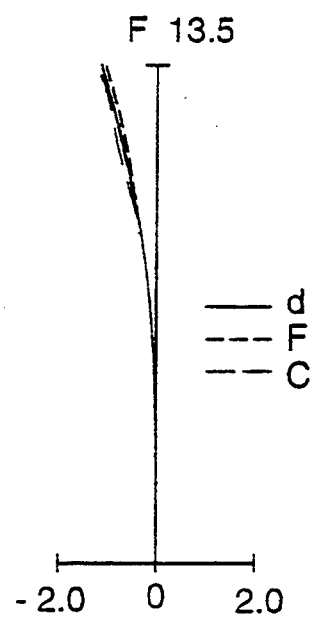
FIGS. 8A–8D is a view showing an aberration curve of the fourth example.
Figure 8B:
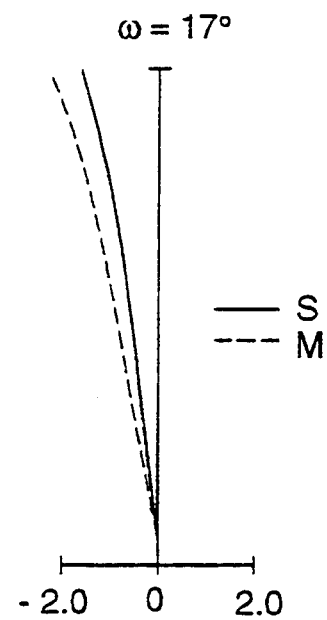
Figure 8C:
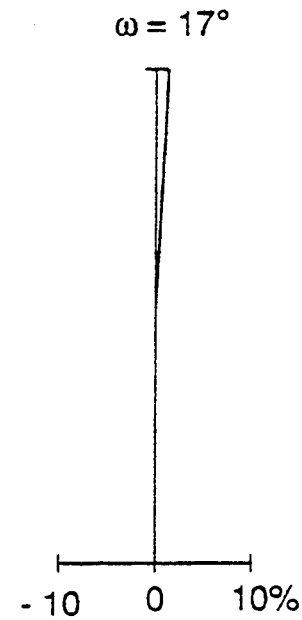
Figure 8D:
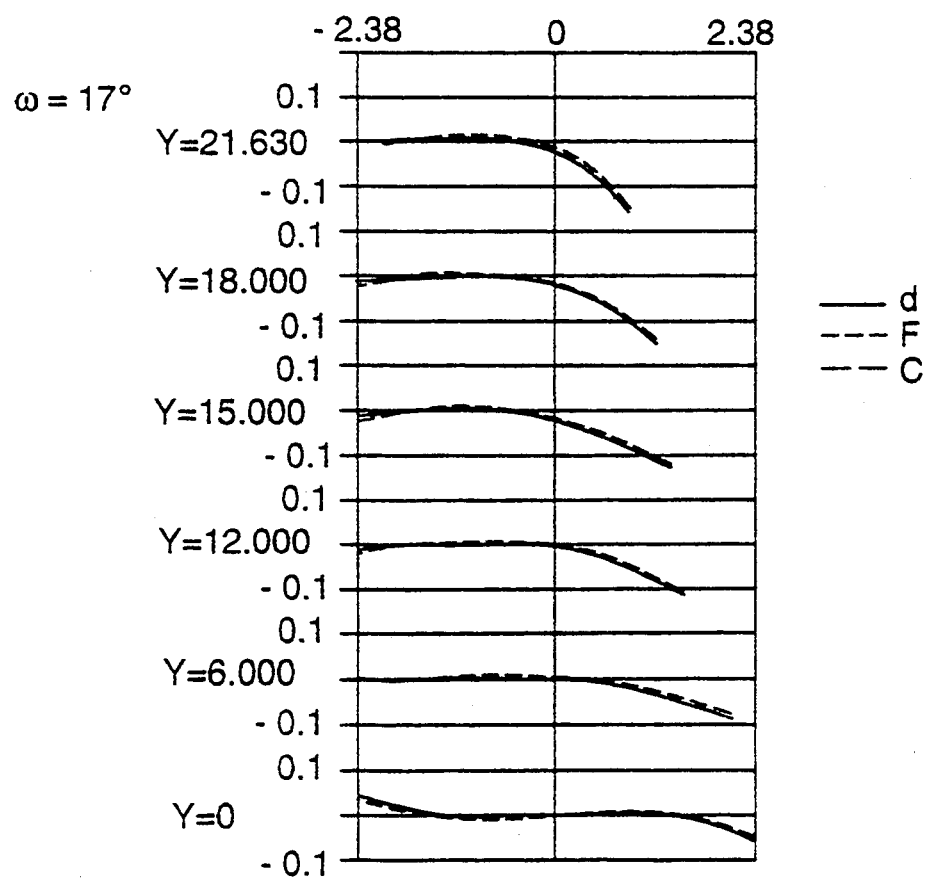

An example of a telephoto-type photographic lens is shown below as the fourth example. A sectional view of the lens in the fourth example is shown in FIG. 7, and a view showing the aberration is shown in FIGS. 8A–8D.

TABLE 5

| surface No. | f = 70.0<br>r | F 13.5<br>d | ω = 17°<br>nd | νd |
|---|---|---|---|---|
| 1. | 13.200 | 1.5 | the refractive<br>index<br>distribution lens | |
| 2. | 15.884 | 1.8 | | |
| 3. | diaphragm for<br>off-axis ray (Φ 5.2) | 0.8 | | |
| 4. | aperture-stop (Φ 4.8) | 4.0 | | |
| 5. | diaphragm for<br>off-axis ray (Φ 4.7) | | | |

| A refractive index distribution function | | | |
|---|---|---|---|
| wavelength | $n_0 i$ | $n_1 i$ | $n_2 i$ |
| d | 1.83400 | $-0.300 \times 10^{-3}$ | 0.0 |
| F | 1.84982 | $-0.206 \times 10^{-3}$ | $0.25 \times 10^{-5}$ |
| c | 1.82738 | $-0.340 \times 10^{-3}$ | $-0.10 \times 10^{-5}$ |
| Image formation surface R200 | | | |

Figure 9:
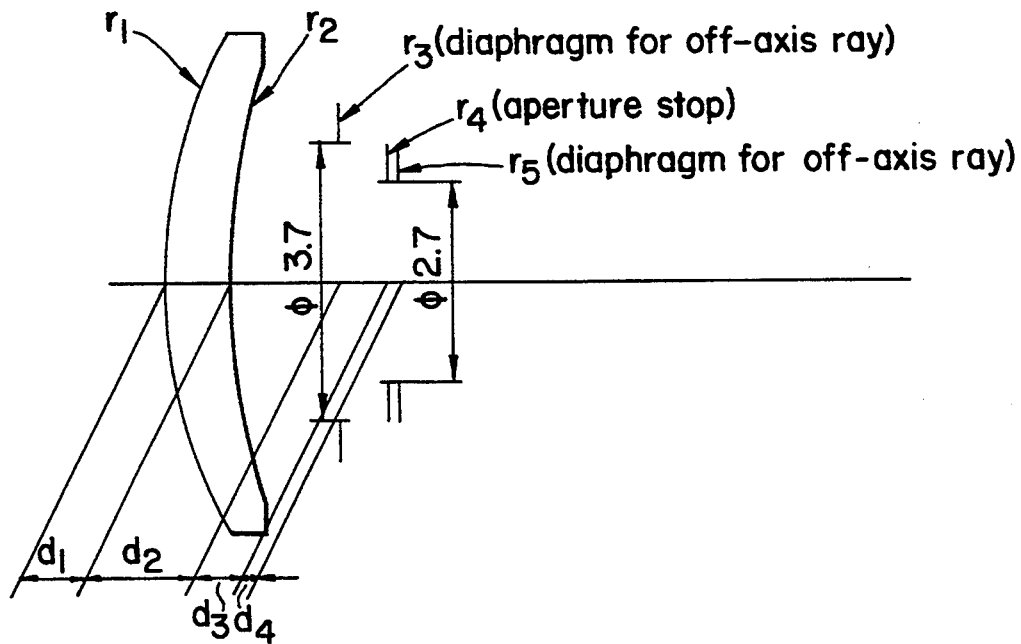
FIG. 9 is a sectional view showing the composition of the fifth example of the refractive index distribution type lens according to the present invention.

An example in which the lens surface is aspherical is shown below as the fifth example. A sectional view of the lens in the fifth example is shown in FIG. 9, and a view showing the aberration is shown in FIGS. 10A–10D.

(TABLE 6)

| surface No. | f = 30.7 r | F 9.8 d | ω = 35.5° nd | vd |
|---|---|---|---|---|
| 1. | aspherical | 0.9 | the refractive index distribution lens | |
| 2. | 7.886 | 1.8 | | |
| 3. | diaphragm for off-axis ray (φ 3.7) | 1.0 | | |
| 4. | aperture-stop (φ 2.7) | 0.2 | | |
| 5. | diaphragm for off-axis ray (φ 2.7) | | | |

A refractive index distribution function

| wavelength | $n_0i$ | $n_1i$ | $n_2i$ |
|---|---|---|---|
| d | 1.4920 | $0.10 \times 10^{-3}$ | $0.12 \times 10^{-4}$ |
| F | 1.4980 | $0.35 \times 10^{-3}$ | $0.48 \times 10^{-4}$ |
| c | 1.4894 | 0.0 | $-0.40 \times 10^{-5}$ |

(Formula 1)

Aspherical surface:

$$x = \frac{h^2/r}{1 + \sqrt{1 - (K+1)h^2/r^2}} + A_4 h^4 + A_6 h^6 + A_8 h^8 + A_{10} h^{10}$$

Where,
r = 5.365  K = 0.2227  $A_4 = -0.19278 \times 10^{-3}$
$A_6 = -0.14882 \times 10^{-4}$  $A_8 = 0.18833 \times 10^{-5}$
$A_{10} = -0.13493 \times 10^{-6}$
The image formation surface   Cylindrical surface R110

As can be seen in the view showing the aberration of each example, a refractive index distribution type lens of the present invention can almost totally reduce the astigmatic difference which has been conventionally a problem in this type of lens. As the result, even in the case where the remaining curvature of the field is a problem, the film surface can be easily fitted to the image surface when the film surface is curved.

Further, when a coefficient of the refraction index distribution is properly selected, the axial chromatic aberration and the transverse chromatic aberration, correction of which have been conventionally considered to be impossible in the case of the single lens, can be corrected according to the present invention, which makes the invention highly advantageous.

What is claimed is:

1. An optical device, comprising
a single lens of a meniscus-type lens whose index of refraction is distributed in a radial direction perpendicular to the optical axis thereof; and
a diaphragm having an aperture and provided at the concave side of the meniscus-type lens;
wherein the optical device satisfies the following formulas, $7 \leq F \leq 16$ $20° \leq 2\omega \leq 90°$ where, an F number of the optical system is defined as F, and an angle of view of the lens is defined as $2\omega$, and wherein, when the refractive index distribution in the radial direction perpendicular to the axis is defined by the following formula:

$n_i = n_0 i + n_1 i h^2 + n_2 i h^4 + n_3 i h^6$
i: "i" shows d, F, or C line
h: height from the axis
the optical device satisfies the following formulas:

$n_1 c - N_1 d < 0$ $n_1 F - n_1 d < 0.$

2. The optical device of claim 1 wherein the meniscus lens is arranged so that the convex side of the lens faces an object and the concave side of the lens faces an image forming surface on which an image of the object is formed through the lens.

3. The optical device of claim 2, wherein the image formed by the lens is configured for a curved image forming surface having side portions thereof positioned closer to the lens than the central portion thereof.

4. The optical device of claim 3, wherein the image formed by the lens is configured for an image forming surface which is a cylindrical surface.

5. The optical device of claim 2, wherein the image formed by the lens is configured for an image forming surface which is a flat surface.

6. The apparatus of claim 2, wherein the image formed by the lens is configured for an image forming surface comprising a 35 mm photographic roll film, and the focal length f of the lens satisfies the formula:

$20 \leq f \leq 100.$

7. The apparatus of claim 1, wherein the optical device satisfies the following formulas:

$n_2 C - n_2 d < 0$ $n_2 F - n_2 d > 0$

8. The apparatus of claim 7, wherein at least one of the object-side surface and the image-forming-side surface of the lens is an aspherical surface.

9. The apparatus of claim 7, wherein both of the object-side surface and the image-forming-side surface of the lens are spherical surfaces respectively.

* * * * *